US008064615B2

(12) United States Patent
Murakami

(10) Patent No.: US 8,064,615 B2
(45) Date of Patent: Nov. 22, 2011

(54) AUDIO SIGNAL PROCESSING APPARATUS

(75) Inventor: Kazutoshi Murakami, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 449 days.

(21) Appl. No.: 12/430,988

(22) Filed: Apr. 28, 2009

(65) Prior Publication Data

US 2010/0111310 A1 May 6, 2010

(30) Foreign Application Priority Data

Nov. 6, 2008 (JP) ................................ 2008-285316

(51) Int. Cl.
*H04B 3/00* (2006.01)

(52) U.S. Cl. .............................. 381/80; 381/77; 381/81

(58) Field of Classification Search .......... 381/1, 19–23, 381/77, 80, 81, 123
See application file for complete search history.

(56) References Cited

U.S. PATENT DOCUMENTS

| | | | | |
|---|---|---|---|---|
| 5,581,626 | A * | 12/1996 | Palmer | 381/103 |
| 6,850,621 | B2 | 2/2005 | Sotome et al. | |
| 7,236,838 | B2 | 6/2007 | Katayama et al. | |

FOREIGN PATENT DOCUMENTS

| | | |
|---|---|---|
| JP | 10-70797 | 3/1998 |
| JP | 2000-217197 | 8/2000 |
| JP | 2002-171599 | 6/2002 |
| JP | 2003-37899 | 2/2003 |
| JP | 3094993 | 7/2003 |
| JP | 2004-112014 | 4/2004 |
| JP | 2005-175799 | 6/2005 |
| JP | 2005-218003 | 8/2005 |
| JP | 2003-116200 | 4/2006 |

* cited by examiner

*Primary Examiner* — Hoai V Pham
(74) *Attorney, Agent, or Firm* — Renner, Otto, Boisselle & Sklar, LLP

(57) ABSTRACT

An audio signal processing apparatus comprising: an audio data generation part for generating third audio data from first audio data and second audio data, the first audio data including first L-channel data and first R-channel data which are alternately and serially arranged in a word unit, the second audio data including second L-channel data and second R-channel data which are alternately and serially arranged in the word unit, and the third audio data including the first L-channel data and the second L-channel data which are alternately and serially arranged in the word unit; a DA conversion part for dividing the third audio data into the first L-channel data and the second L-channel data and converting the first L-channel data and the second L-channel data into a first analog signal and a second analog signal, respectively; and a combining part for combining the first analog signal with the second analog signal to form a third analog signal.

11 Claims, 5 Drawing Sheets

AUDIO SIGNAL PROCESSING APPARATUS

BACKGROUND OF THE INVENTION

1. Field of the Invention

The present invention relates to an audio signal processing apparatus that converts a digital audio signal to be inputted thereto into an analog audio signal. More particularly, the present invention relates to a multi-channel audio signal processing apparatus that simultaneously processes a plurality of audio signals.

2. Description of the Related Art

In a digital audio device, an audio signal processing apparatus that converts a digital audio signal to be inputted thereto into an analog audio signal is used. As a format of a digital audio signal to be inputted, an I2S format, for example, is known.

FIG. 6 is a diagram showing signal waveforms of digital audio signals transmitted in the I2S format (hereinafter, referred to as the "I2S signals"). The I2S signals include a DATA signal in which L-channel audio data and R-channel audio data are alternately arranged on a word-data basis; a word clock signal (hereinafter, referred to as the "LRCK signal") for identifying word data of the DATA signal; and a bit clock signal (hereinafter, referred to as the "BCLK signal") for identifying each of bit data constituting word data.

The DATA signal is serial data (DL1/DR1, DL2/DR2, . . . DLm/DRm) obtained by making a pair L-channel data DLi (corresponding to n-bit data and one word data) and R-channel data DRi (corresponding to n-bit data and one word data) which are at the same sampling location i and arranging pairs in order of sampling. The LRCK signal is a clock whose one cycle corresponds to one-word data DLi/DRi of the DATA signal. In FIG. 6, a low-level (hereinafter, referred to as the "L-level") period of the LRCK signal is synchronized with L-channel word data DLi of the DATA signal and a high-level (hereinafter, referred to as the "H-level") period of the LRCK signal is synchronized with R-channel word data DRi of the DATA signal. The BCLK signal is a clock that is synchronized with bit data of the DATA signal.

The DATA signal is divided into L-channel word data DLi and R-channel word data DRi using the LRCK signal, and is converted into an analog signal on a bit-data basis using the BCLK signal. By this, the I2S signals are converted into an L-channel-data-based analog audio signal and an R-channel-data-based analog audio signal.

In the case of multi-channel digital audio signals, a plurality of DATA signals may be used. Some digital audio devices, as will be described below, not only convert digital audio signals of various channels included in a DATA signal into analog audio signals but also generate and output an analog audio signal in which a combination of two audio signals different from a combination of the two audio signals included in the DATA signal is mixed.

FIG. 6 shows I2S signals for a 5.1ch surround speaker system. Note that, in the 5.1ch surround speaker system, six speakers are placed around a listener (see FIG. 5A), including an L-channel front speaker (a speaker on the forward left side of the listener; an FL speaker), an R-channel front speaker (a speaker on the forward right side of the listener; an FR speaker), an L-channel rear speaker (a speaker on the rear left side of the listener; an SL speaker), an R-channel rear speaker (a speaker on the rear right side of the listener; an SR speaker), a center speaker (a speaker at the forward center of the listener; a C speaker), and a subwoofer speaker (a speaker dedicated to bass sounds; an SW speaker); therefore, DATA signals of I2S signals for 5.1ch surround include six types of digital audio signals for their corresponding speakers. In FIG. 6, however, for convenience of description, digital audio signals for the C speaker and the SW speaker, which are included in the DATA signals, are not shown. In the following description, in some instances, the "channel" is denoted as "ch".

DATA signals of I2S signals for 5.1ch surround include an FL_FR signal in which audio data (FL data) which is converted into audio to be outputted from the FL speaker and audio data (FR data) which is converted into audio to be outputted from the FR speaker are combined; and an SL_SR signal in which audio data (SL data) which is converted into audio to be outputted from the SL speaker and audio data (SR data) which is converted into audio to be outputted from the SR speaker are combined.

The FL_FR signal included in the DATA signals of the I2S signals shown in FIG. 6 is divided into FL data and FR data and the SL_SR signal is divided into SL data and SR data. The FL data, the FR data, the SL data, and the SR data are respectively converted into an fl signal, an fr signal, an sl signal, and an sr signal which are analog audio signals. The converted fl signal, fr signal, sl signal, and sr signal are respectively outputted to the FL speaker, the FR speaker, the SL speaker, and the SR speaker. Note that a digital audio signal for the C speaker is converted into a c signal which is an analog audio signal and outputted to the C speaker and a digital audio signal for the SW speaker is converted into an sw signal which is an analog audio signal and outputted to the SW speaker.

A digital audio device (audio amplifier) which is applied to a 5.1ch surround speaker system is, as described above, provided with output terminals for six analog audio signals (an fl signal, an fr signal, an sl signal, an sr signal, a c signal, and an sw signal) for six speakers; however, when the user does not have a 5.1ch surround speaker system, those output terminals that do not have their corresponding speakers are not connected and thus analog audio signals for those output terminals are not used.

For example, when a speaker system owned by the user is one that includes an FL speaker, an FR speaker, and a C speaker, in this speaker system, an sl signal, an sr signal, and an sw signal cannot be used. To overcome such inconvenience, some audio amplifiers which are applicable to a 5.1ch surround speaker system are configured to output a signal (fl_sl signal) in which an fl signal and an sl signal are mixed, from an output terminal for the fl signal and output a signal (fr_sr signal) in which an fr signal and an sr signal are mixed, from an output terminal for the fr signal. When such audio amplifiers are combined with a speaker system including an FL speaker, an FR speaker, and a C speaker, by causing the FL speaker and the FR speaker to respectively output an fl_sl signal and an fr_sr signal as audio signals, both an sl signal and an sr signal can be effectively used.

FIG. 7 is a diagram for describing an audio signal processing apparatus capable of generating analog audio signals, i.e., an fl signal, an fr signal, an sl signal, an sr signal, an fl_sl signal, and an fr_sr signal, from digital audio signals, i.e., an FL_FR signal and an SL_SR signal, and outputting two different types of combinations by switching therebetween. An audio signal processing apparatus A100 includes DA converter circuits 310 and 320, differential circuits 410 and 420, switching circuits 510 and 520, and output terminals 610*a*, 610*b*, 620*a*, and 620*b*.

The DA converter circuits 310 and 320 accept as input DATA signals, an LRCK signal, and a BCLK signal and output converted analog audio signals. The DA converter circuit 310 includes a one-bit DAC 310*a* and low-pass filters 310*b* and 310*c*. The one-bit DAC 310*a* divides an FL_FR signal into FL data and FR data, performs DA conversion on the FL data and the FR data, and outputs an fl signal and an fr signal. The low-pass filters 310*b* and 310*c* respectively remove high-frequency components from the fl signal and the fr signal which are inputted thereto from the one-bit DAC 310*a*. The DA converter circuit 320 includes a one-bit DAC 320*a* and low-pass filters 320*b* and 320*c*. The DA converter circuit 320 converts an SL_SR signal into an sl signal and an sr signal, removes high-frequency components from the sl signal and the sr signal, and outputs the resulting signals.

The differential circuit 410 combines the fl signal inputted thereto from the DA converter circuit 310 with the sl signal inputted thereto from the DA converter circuit 320 and outputs an fl_sl signal. The differential circuit 420 combines the fr signal inputted thereto from the DA converter circuit 310 with the sr signal inputted thereto from the DA converter circuit 320 and outputs an fr_sr signal.

The switching circuit 510 switches between the fl signal outputted from the DA converter circuit 310 and the fl_sl signal outputted from the differential circuit 410 and causes the output terminal 610*a* to output either signal. The switching circuit 520 switches between the fr signal outputted from the DA converter circuit 310 and the fr_sr signal outputted from the differential circuit 420 and causes the output terminal 620*a* to output either signal. The switching circuits 510 and 520 are switched in a coordinated manner and the four output terminals 610*a*, 610*b*, 620*a*, and 620*b* output one of a combination of (an fl signal, an sl signal, an fr signal, and an sr signal) and a combination of (an fl_sl signal, an sl signal, an fr_sr signal, and an sr signal).

The audio signal processing apparatus A100 is implemented by mounting the DA converter circuits 310 and 320, the differential circuits 410 and 420, and the switching circuits 510 and 520 on a substrate and providing pattern wiring between the circuits. At this time, in order that the fl signal outputted from the low-pass filter 310*b* of the DA converter circuit 310 is inputted to the differential circuit 410, an output of the low-pass filter 310*b* and an input of the differential circuit 410 need to be pattern-wired, and in order that the fr signal outputted from the low-pass filter 310*c* is inputted to the differential circuit 420, an output of the low-pass filter 310*c* and an input of the differential circuit 420 need to be pattern-wired. In addition, an output of the low-pass filter 320*b* and an input of the differential circuit 410 need to be pattern-wired and an output of the low-pass filter 320*c* and an input of the differential circuit 420 need to be pattern-wired.

However, as shown in FIG. 7, since the pattern wiring for the fr signal between the DA converter circuit 310 and the differential circuit 420 intersects with the pattern wiring for the sl signal between the DA converter circuit 320 and the differential circuit 410, these pattern wirings cannot be wired on the same plane of the substrate by patterning. Hence, measures need to be taken such as detouring one of the pattern wirings by a jumper wire or detouring one of the pattern wirings by a through-hole and a pattern wiring formed on the back side. As a result, the wirings on the substrate become complicated and a detoured pattern wiring has a longer line length than the other pattern wiring and thus noise is more likely to be superimposed on an analog audio signal flowing through the detoured pattern wiring, causing a problem that sound quality is adversely affected thereby.

SUMMARY OF THE INVENTION

The present invention is made in view of the aforementioned circumstances and an object of the present invention is therefore to provide an audio signal processing apparatus in which two signals inputted to a differential circuit are outputted from the same DA converter circuit.

According to a preferred embodiment of the present invention, an audio signal processing apparatus comprising: an audio data generation part for generating third audio data from first audio data and second audio data, the first audio data including first L-channel data and first R-channel data which are alternately and serially arranged in a word unit, the second audio data including second L-channel data and second R-channel data which are alternately and serially arranged in the word unit, and the third audio data including the first L-channel data and the second L-channel data which are alternately and serially arranged in the word unit; a DA conversion part for dividing the third audio data into the first L-channel data and the second L-channel data and converting the first L-channel data and the second L-channel data into a first analog signal and a second analog signal, respectively; and a combining part for combining the first analog signal with the second analog signal to form a third analog signal.

According to this configuration, although the first L-channel data and the second L-channel data are inputted being included in different audio data units, the third audio data including the first L-channel data and the second L-channel data is generated by the audio data generation part. The third audio data is converted into the first analog signal and the second analog signal by the DA conversion part. Accordingly, the first analog signal and the second analog signal which are to be inputted to be combined by the combining part, are outputted from the same DA conversion part.

Preferably, the audio signal processing apparatus further comprising a switching part for switching between a first output state in which only the first analog signal and the second analog signal are outputted, and a second output state in which at least the third analog signal is outputted.

According to this configuration, switching can be performed between the first output state in which the first analog signal and the second analog signal are separately outputted, and the second output state in which the first analog signal and the second analog signal are combined and outputted. Accordingly, analog signals to be outputted can be changed according to the connection state of speakers of an audio system.

Preferably, the audio data generation part accepts as input a word clock which is inverted in the word unit; the first audio data with which a low level of the word clock and the first L-channel data are synchronized; and the second audio data with which a high level of the word clock and the second L-channel data are synchronized, and the audio data generation part includes: a first AND circuit that generates first extracted audio data by extracting the first L-channel data by computing an AND of the first audio data and an inverted clock obtained by inverting the word clock; a second AND circuit that generates second extracted audio data by extracting the second L-channel data by computing an AND of the second audio data and the word clock; and an OR circuit that generates the third audio data by computing an OR of the first extracted audio data and the second extracted audio data.

According to this configuration, the audio data generation part can generate the third audio data from the first audio data and the second audio data.

Preferably, the first audio data is I2S-format digital audio data and the second audio data is data obtained by switching L-channel data and R-channel data of I2S-format digital audio data.

Preferably, the audio data generation part further generates fourth audio data including the first R-channel data and the second R-channel data which are alternately and serially arranged in the word unit, the audio signal processing apparatus further comprises: a second DA conversion part for dividing the generated fourth audio data into the first R-channel data and the second R-channel data and converting the first R-channel data and the second R-channel data into a fourth analog signal and a fifth analog signal, respectively; and a second combining part for combining the fourth analog signal with the fifth analog signal to form a sixth analog signal, and when an output state is switched to the first output state by the switching part, only the first analog signal, the second analog signal, the fourth analog signal, and the fifth analog signal are outputted, and when an output state is switched to the second output state, at least the third analog signal and the sixth analog signal are outputted.

According to this configuration, the fourth analog signal and the fifth analog signal which are inputted to the second combining part are outputted from the same second DA conversion part. Thus, upon implementation on a substrate, the combining part is connected only to the DA conversion part by pattern wiring and the second combining part is connected only to the second DA conversion part by pattern wiring. Accordingly, the combining part and the second combining part are not each connected to both of the DA conversion part and the second DA conversion part, enabling to prevent a part of pattern wirings from becoming long due to detouring.

Preferably, the audio data generation part, the DA conversion part, the second DA conversion part, the combining part, and the second combining part each are provided in at least two pieces, six 9.2ch audio data units are inputted, and when an output state is switched to the first output state by the switching part, the first analog signal, the second analog signal, the fourth analog signal, and the fifth analog signal are outputted as 9.2ch analog signals, and when an output state is switched to the second output state by the switching part, the third analog signal and the sixth analog signal are outputted as 5.1ch analog signals.

According to this configuration, switching can be performed between the first output state in which analog signals obtained by dividing and converting audio data units are separately outputted as 9.2ch analog signals, and the second output state in which signals obtained by combining the analog signals are outputted as 5.1ch analog signals. Accordingly, analog signals to be outputted can be changed between analog signals for 9.2ch and for 5.1ch, according to the connection state of speakers of an audio system.

According to the other preferred embodiment of the present invention, an audio signal processing apparatus comprising: an audio data generation part for generating third audio data from first audio data and second audio data, the first audio data including first L-channel data and first R-channel data which are alternately and serially arranged in a word unit, the second audio data including second L-channel data and second R-channel data which are alternately and serially arranged in the word unit, and the third audio data including the first R-channel data and the second R-channel data which are alternately and serially arranged in the word unit; a DA conversion part for dividing the third audio data into the first R-channel data and the second R-channel data and converting the first R-channel data and the second R-channel data into a first analog signal and a second analog signal, respectively; and a combining part for combining the first analog signal with the second analog signal to form a third analog signal.

Preferably, the audio data generation part accepts as input a word clock which is inverted in the word unit; the first audio data with which a high level of the word clock and the first R-channel data are synchronized; and the second audio data with which a low level of the word clock and the second R-channel data are synchronized, and the audio data generation part includes: a first AND circuit that generates first extracted audio data by extracting the first R-channel data by computing an AND of the first audio data and the word clock; a second AND circuit that generates second extracted audio data by extracting the second R-channel data by computing an AND of the second audio data and an inverted clock obtained by inverting the word clock; and an OR circuit that generates the third audio data by computing an OR of the first extracted audio data and the second extracted audio data.

DETAILED DESCRIPTION OF THE PREFERRED EMBODIMENTS

Preferred embodiments of the present invention will be described in detail below with reference to the drawings.

Figure 1:
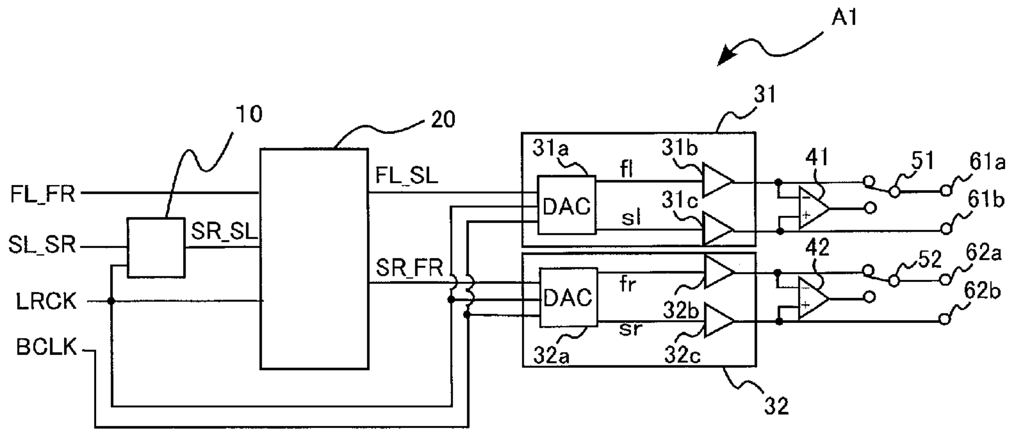
FIG. 1 is a diagram for describing a first embodiment of an audio signal processing apparatus according to the present invention.

FIG. 1 is a diagram for describing a first embodiment of an audio signal processing apparatus according to the present invention. An audio signal processing apparatus A1 can generate analog audio signals, i.e., an fl signal, an fr signal, an sl signal, an sr signal, an fl_sl signal, and an fr_sr signal, from digital audio signals, i.e., an FL_FR signal and an SL_SR signal, and output two different types of combinations by switching therebetween. The audio signal processing apparatus A1 includes a data inverting circuit 10, a data rearranging circuit 20, DA converter circuits 31 and 32, differential circuits 41 and 42, switching circuits 51 and 52, and output terminals 61*a*, 61*b*, 62*a*, and 62*b*.

A DATA signal includes audio data of two channels, i.e., L-channel audio data and R-channel audio data. The data inverting circuit 10 and the data rearranging circuit 20 rearrange a combination of audio data of two channels and a combination of audio data of two channels which are respectively included in two DATA signals inputted thereto, and output the rearranged combinations of audio data. Specifically, for example, when the I2S signals shown in FIG. 6 are inputted, the data inverting circuit 10 and the data rearranging circuit 20 switch FR data included in an FL_FR signal and SL data included in an SL_SR signal and thereby convert the FL_FR signal into an FL_SL signal in which FL data and the SL data are combined, and the SL_SR signal into an SR_FR signal in which SR data and the FR data are combined, and output the FL_SL signal and the SR_FR signal.

Figure 6:
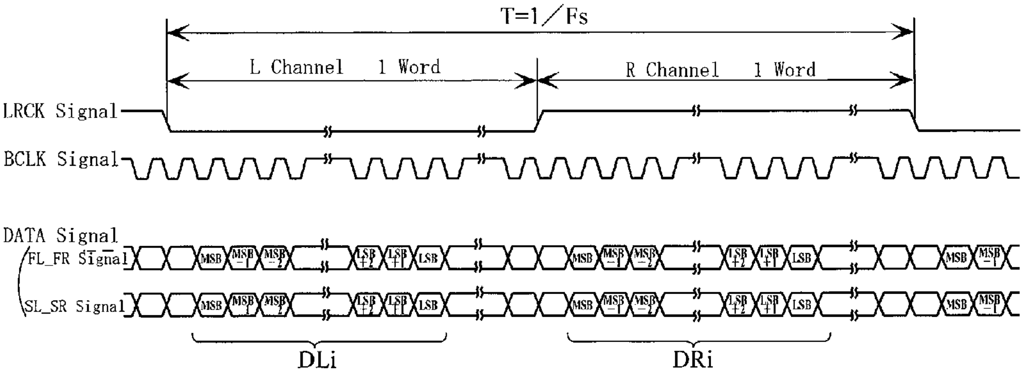
FIG. 6 is a diagram showing signal waveforms of digital audio signals transmitted in an I2S format.

The data inverting circuit 10 switches the orders of L-channel audio data and R-channel audio data in each word of a DATA signal to be inputted thereto (specifically, in the I2S signals shown in FIG. 6, the orders of L-channel data DLi and R-channel data DRi of a DATA signal are switched such that the R-channel data DRi is made to correspond to a low level of a LRCK signal and the L-channel data DLi is made to correspond to a high level of a LRCK signal). The data inverting circuit 10 accepts as input an SL_SR signal which is one of the two DATA signals of the I2S signals shown in FIG. 6 and an LRCK signal, and outputs an SR_SL signal in which the orders of SL data DLi and SR data DRi in each word are switched, to the data rearranging circuit 20.

The data rearranging circuit 20 switches R-channel audio data in each word of two signals to be inputted thereto. Since the data rearranging circuit 20 accepts as input the SR_SL signal outputted from the data inverting circuit 10, an FL_FR signal which is the other DATA signal of the I2S signals, and an LRCK signal, the data rearranging circuit 20 outputs an FL_SL signal and an SR_FR signal which are obtained by rearranging FR data of the FL_FR signal and SL data of the SR_SL signal.

Figure 2:
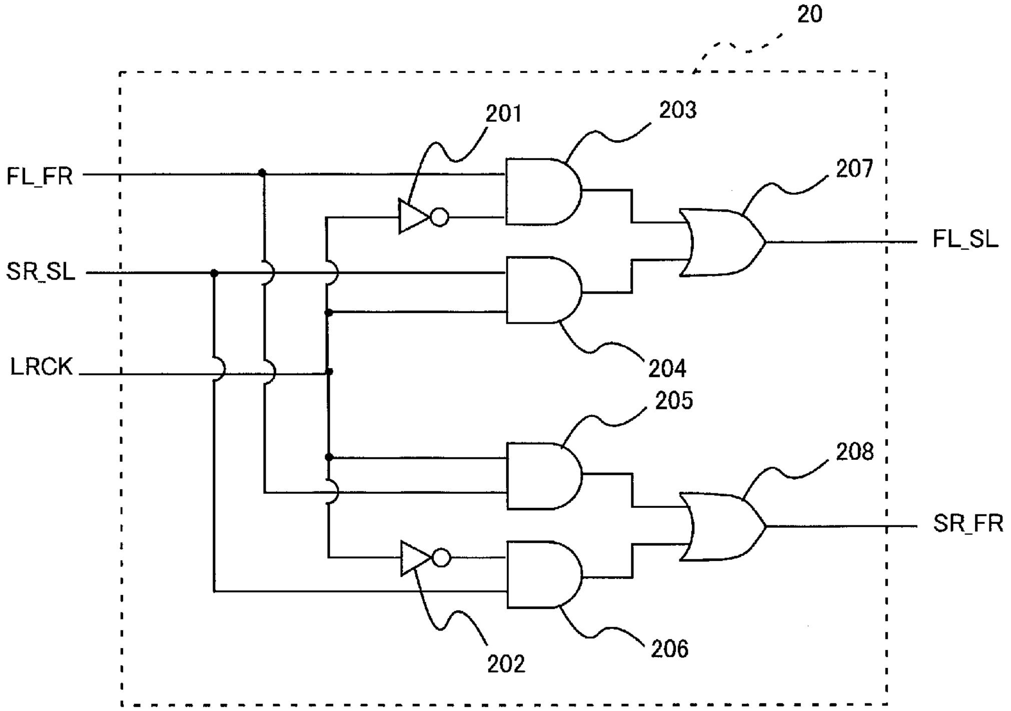
FIG. 2 is a diagram showing a logic circuit of a data rearranging circuit.

FIG. 2 is a diagram showing a logic circuit of the data rearranging circuit 20.

The data rearranging circuit 20 includes a first logic circuit that switches FR data included in an FL_FR signal to SL data included in an SR_SL signal and thereby generates an FL_SL signal in which FL data and the SL data are combined; and a second logic circuit that switches SL data included in an SR_SL signal to FR data included in an FL_FR signal and thereby generates an SR_FR signal in which SR data and the FR data are combined.

The first logic circuit includes one NOT circuit 201, two AND circuits 203 and 204, and one OR circuit 207. The second logic circuit includes one NOT circuit 202, two AND circuits 205 and 206, and one OR circuit 208. As shown in FIG. 2, the circuit configuration of the second logic circuit is the same as that of the first logic circuit.

An LRCK signal is inputted to one input of each of the AND circuits 204 and 205 and an LRCK signal is inputted to one input of each of the AND circuits 203 and 206 through the NOT circuits 201 and 202. An FL_FR signal is inputted to the other input of each of the AND circuits 203 and 205 and an SR_SL signal is inputted to the other input of each of the AND circuits 204 and 206. Outputs from the respective AND circuits 203 and 204 are inputted to the OR circuit 207 and outputs from the respective AND circuits 205 and 206 are inputted to the OR circuit 208. The OR circuits 207 and 208 respectively output an FL_SL signal and an SR_FR signal.

Figure 3A:
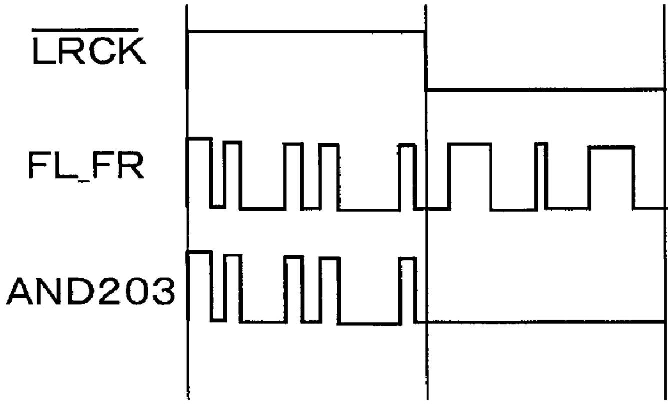
FIGS. 3A to 3C are diagrams for describing a logical operation performed by the data rearranging circuit.
Figure 3B:
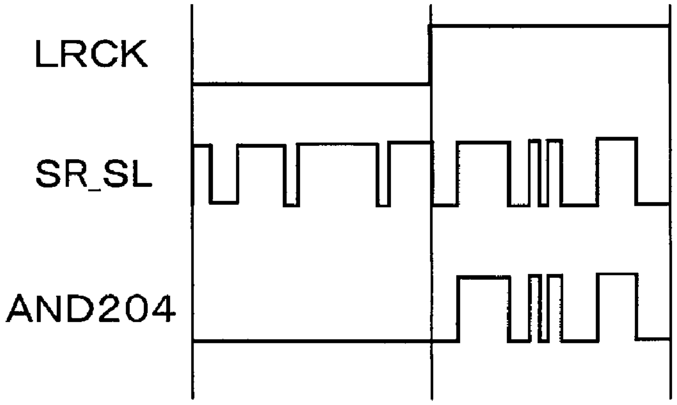
Figure 3C:
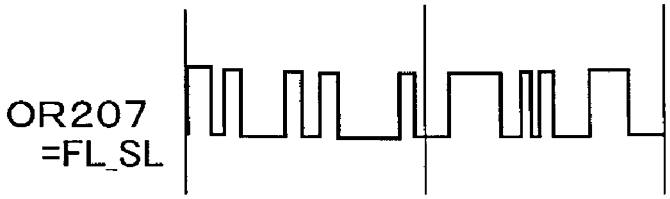

FIGS. 3A to 3C are diagrams for describing that an FL_FR signal and an SR_SL signal are rearranged by performing a logical operation by the data rearranging circuit 20, whereby an FL_SL signal is generated.

FIG. 3A shows waveforms of two input signals and one output signal in the AND circuit 203. The upper and middle waveforms respectively represent waveforms of an inversion signal of an LRCK signal and an FL_FR signal which are input signals, and the lower waveform represents a waveform of an AND203 signal which is an AND of the two input signals. Since an L-level period of the LRCK signal is synchronized with FL data of the FL_FR signal which is an L channel, an H-level period of the inversion signal of the LRCK signal is synchronized with the FL data of the FL_FR signal which is the L channel. Thus, the AND203 signal is a signal obtained by extracting only the FL data from the FL_FR signal.

FIG. 3B shows waveforms of two input signals and one output signal in the AND circuit 204. The upper and middle waveforms respectively represent waveforms of an LRCK signal and an SR_SL signal which are input signals, and the lower waveform represents a waveform of an AND204 signal which is an AND of the two input signals. Since an H-level period of the LRCK signal is synchronized with SL data of the SR_SL signal which is an R channel, the AND204 signal is a signal obtained by extracting only the SL data from the SR_SL signal.

FIG. 3C shows an OR207 signal outputted from the OR circuit 207 as an OR of the AND203 signal and the AND204 signal. The OR207 signal is an FL_SL signal in which the L channel is FL data and the R channel is SL data.

Similarly, an AND205 signal outputted from the AND circuit 205 is a signal obtained by extracting only FR data from an FL_FR signal. An AND206 signal outputted from the AND circuit 206 is a signal obtained by extracting only SR data from an SR_SL signal. Therefore, an OR208 signal outputted from the OR circuit 208 is an SR_FR signal in which the L channel is SR data and the R channel is FR data.

Returning to FIG. 1, the DA converter circuit 31 accepts as input the FL_SL signal outputted from the data rearranging circuit 20 and an LRCK signal and a BCLK signal which are I2S signals and converts the FL_SL signal into an fl signal and an sl signal which are analog audio signals and then outputs the fl signal and the sl signal. The DA converter circuit 31 includes a one-bit DAC 31*a* and low-pass filters 31*b* and 31*c*. The one-bit DAC 31*a* includes a digital filter (not shown) that divides the FL_SL signal into FL data and SL data; and two DA converters (not shown) that respectively serially convert the FL data and the SL data into analog signals on a bit-by-bit basis. Accordingly, the one-bit DAC 31*a* outputs an fl signal obtained by DA converting the FL data and an sl signal obtained by DA converting the SL data. The low-pass filters 31*b* and 31*c* respectively remove high-frequency components from the fl signal and the sl signal which are inputted from the one-bit DAC 31*a*.

The DA converter circuit 32 accepts as input the SR_FR signal outputted from the data rearranging circuit 20 and an LRCK signal and a BCLK signal which are I2S signals and converts the SR_FR signal into an fr signal and an sr signal which are analog audio signals and then outputs the fr signal and the sr signal. The DA converter circuit 32 includes a one-bit DAC 32*a* and low-pass filters 32*b* and 32*c* which respectively correspond to the one-bit DAC 31*a* and the low-pass filters 31*b* and 31*c* of the DA converter circuit 31. The DA converter circuit 32 converts the SR_FR signal into an fr signal and an sr signal, removes high-frequency components from the fr signal and the sr signal, and outputs the resulting signals.

The differential circuits 41 and 42 are each configured by an operational amplifier, for example, and perform differential amplification of two analog signals inputted thereto and thereby output an analog signal in which the two analog signals are combined. The differential circuit 41 combines the fl signal and the sl signal which are inputted from the DA converter circuit 31 and outputs an fl_sl signal. The differential circuit 42 combines the fr signal and the sr signal which are inputted from the DA converter circuit 32 and outputs an fr_sr signal.

The switching circuit 51 switches between the fl signal outputted from the DA converter circuit 31 and the fl_sl signal outputted from the differential circuit 41 and causes the output terminal 61*a* to output either signal. The switching circuit 52 switches between the fr signal outputted from the DA converter circuit 32 and the fr_sr signal outputted from the differential circuit 42 and causes the output terminal 62*a* to output either signal. The switching circuits 51 and 52 are switched in a coordinated manner and the four output terminals 61*a*, 61*b*, 62*a*, and 62*b* output one of a combination of (an fl signal, an sl signal, an fr signal, and an sr signal) and a combination of (an fl_sl signal, an sl signal, an fr_sr signal, and an sr signal). Note that switches that operate with the switching circuits 51 and 52 in a coordinated manner may be respectively provided between the DA converter circuit 31 and the output terminal 61*b* and between the DA converter circuit 32 and the output terminal 62*b* so that when the output terminals 61*a* and 62*a* respectively output an fl_sl signal and an fr_sr signal, the output terminals 61*b* and 62*b* do not respectively output an sl signal and an sr signal.

Next, an action of the audio signal processing apparatus A1 will be described.

The audio signal processing apparatus A1 is implemented by mounting the DA converter circuits 31 and 32, the differential circuits 41 and 42, and the switching circuits 51 and 52 on a substrate and providing pattern wiring between the circuits. At this time, in order that an fl signal outputted from the low-pass filter 31*b* of the DA converter circuit 31 is inputted to the differential circuit 41, an output of the low-pass filter 31*b* and an input of the differential circuit 41 are pattern-wired, and in order that an sl signal outputted from the low-pass filter 31*c* is inputted to the differential circuit 41, an output of the low-pass filter 31*c* and an input of the differential circuit 41 are pattern-wired. In addition, an output of the low-pass filter 32*b* and an input of the differential circuit 42 are pattern-wired and an output of the low-pass filter 32*c* and an input of the differential circuit 42 are pattern-wired.

Figure 7:
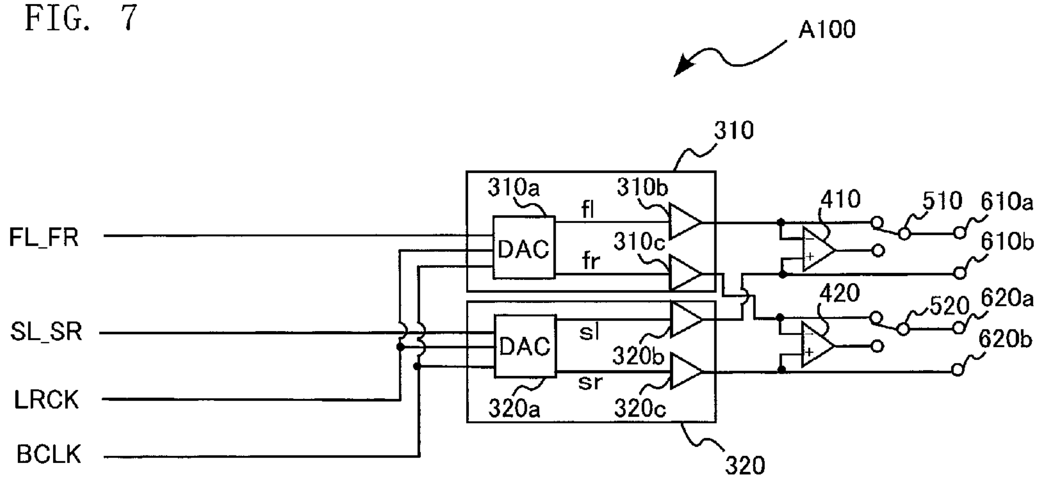
FIG. 7 is a diagram for describing a conventional audio signal processing apparatus.

Comparing FIGS. 1 and 7, the DA converter circuit 310 and the differential circuit 410 in FIG. 7 respectively correspond to the DA converter circuit 31 and the differential circuit 41 in FIG. 1 and the DA converter circuit 320 and the differential circuit 420 in FIG. 7 respectively correspond to the DA converter circuit 32 and the differential circuit 42 in FIG. 1; however, in the present embodiment, a signal line for an sl signal outputted from the DA converter circuit 31 does not intersect with a signal line for an fr signal outputted from the DA converter circuit 32. Accordingly, a circuit block of a portion including the DA converter circuit 31 and the differential circuit 41 and a circuit block of a portion including the DA converter circuit 32 and the differential circuit 42 are each independently pattern-wired, and thus, pattern wiring does not need to intersect with another between the DA converter circuit 31 and the differential circuit 42 and between the DA converter circuit 32 and the differential circuit 41.

Hence, since detouring one of pattern wirings by a jumper wire or detouring one of pattern wirings by a through-hole and a pattern wiring formed on the back side does not need to be performed, pattern wirings for analog audio signals in subsequent stages to the DA converter circuits can be made substantially the same. By this, superimposition of noise on an analog audio signal flowing through a part of a plurality of pattern wirings for analog audio signals can be suppressed, which is caused by the part of pattern wirings for analog audio signals becoming longer than other pattern wirings for analog audio signals; accordingly, degradation of sound quality can be prevented.

Although the first embodiment describes the case in which DATA signals to be inputted are an FL_FR signal and an SL_SR signal, the DATA signals are not limited thereto and may be other signals. That is, in the I2S format, one or more DATA signals are included in which a pair of digital audio signals respectively for a pair of speakers (Lch and Rch speakers) placed on the left and right sides is mixed. However, an audio digital device that supports a speaker system of 4ch or more may in some cases generate and output not only analog audio signals of channels but also a signal in which two analog audio signals (normally, analog audio signals for speakers placed on the front and back on the left side or on the front and back on the right side) are mixed. Thus, in such a case, the present invention can be applied not only to the case of an FL_FR signal and an SL_SR signal but also to the case of two DATA signals in any combination.

Figure 4:
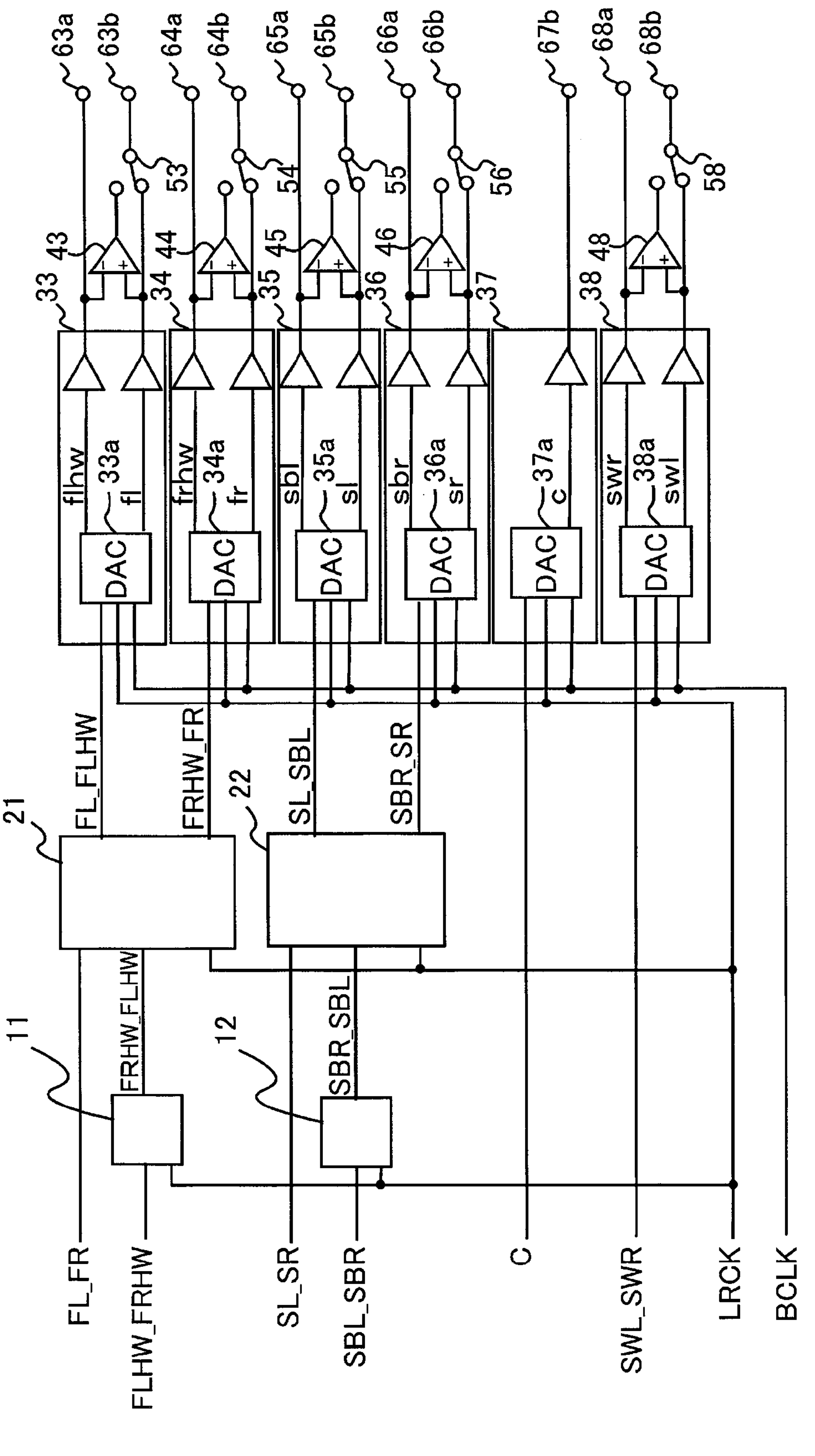
FIG. 4 is a diagram for describing a second embodiment of an audio signal processing apparatus according to the present invention.

FIG. 4 is a diagram for describing a second embodiment of an audio signal processing apparatus according to the present invention.

The second embodiment is such that the present invention is applied to a circuit configuration of an audio amplifier applied to a 9.2ch surround speaker system, which converts digital audio signals into analog audio signals and outputs the analog audio signals. The second embodiment particularly takes into account a user who only owns a 5.1ch surround speaker system, and enables to also output six types of audio signals applicable to the 5.1ch surround speaker system, by switching therebetween.

An audio signal processing apparatus A2 converts 9.2ch I2S signals to be inputted thereto into 9.2ch analog audio signals or 5.1ch analog audio signals and outputs the 9.2ch analog audio signals or the 5.1ch analog audio signals. The audio signal processing apparatus A2 can switch between a 9.2ch surround output and a 5.1ch surround output.

Figure 5A:
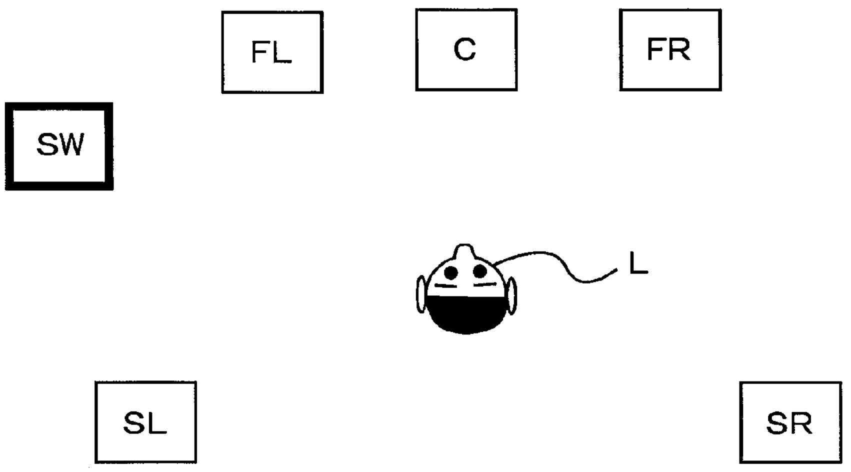
FIGS. 5A and 5B are diagrams for describing placement of speakers in a surround audio system.
Figure 5B:
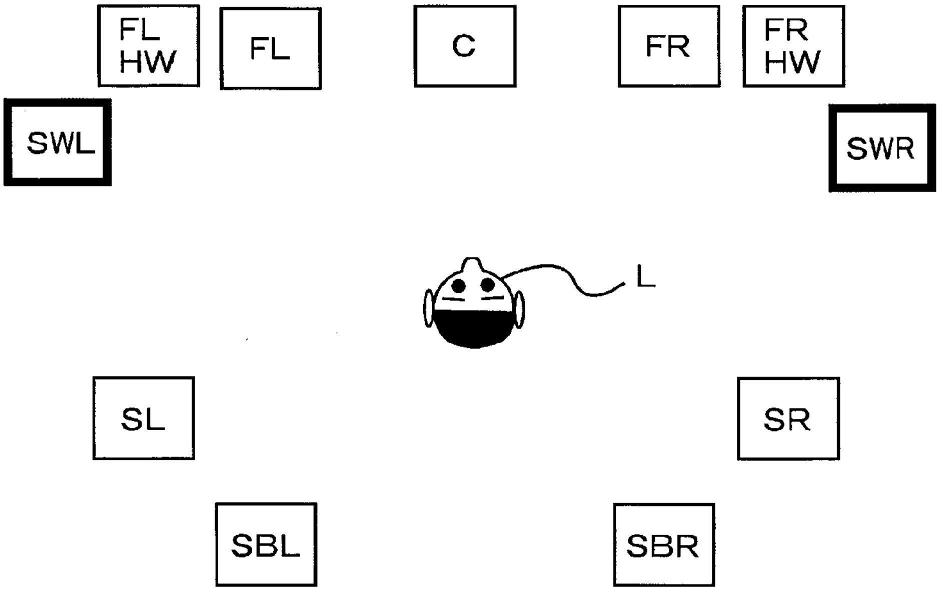

FIGS. 5A and 5B are diagrams for describing the placement of speakers in a surround audio system. FIG. 5A shows the case of 5.1ch surround and FIG. 5B shows the case of a 9.2ch surround system.

Suppose that a listener L faces the upper side in the figures, in the case of 5.1ch surround, as shown in FIG. 5A, five speakers, i.e., an FL speaker on the forward left side of the listener L, an FR speaker on the forward right side, a C speaker at the forward center, an SL speaker on the rear left side, and an SR speaker on the rear right side, and an SW speaker dedicated to bass sounds are placed. In the case of 9.2ch surround, as shown in FIG. 5B, four speakers, i.e., an SBL speaker further rearward of the SL speaker, an SBR speaker further rearward of the SR speaker, an FLHW speaker on the left side of the FL speaker, and an FRHW speaker on the right side of the FR speaker are added, and in place of the SW speaker, an SWL speaker dedicated to bass sounds on the left side and an SWR speaker dedicated to bass sounds on the right side are placed.

To the audio signal processing apparatus A2, 9.2ch surround digital audio signals are inputted in the I2S format. In this case, as DATA signals, an FL_FR signal, an FLHW_FRHW signal (including FLHW data which is converted into audio to be outputted from the FLHW speaker and FRHW data which is converted into audio to be outputted from the FRHW speaker), an SL_SR signal, an SBL_SBR signal (including SBL data which is converted into audio to be outputted from the SBL speaker and SBR data which is converted into audio to be outputted from the SBR speaker), a C signal (including C data which is converted into audio to be outputted from the C speaker), and an SWL_SWR signal (including SWL data which is converted into audio to be outputted from the SWL speaker and SWR data which is converted into audio to be outputted from the SWR speaker) are inputted.

As shown in FIG. 4, the audio signal processing apparatus A2 includes data inverting circuits 11 and 12, data rearranging circuits 21 and 22, DA converter circuits 33, 34, 35, 36, 37, and 38, differential circuits 43, 44, 45, 46, and 48, switching circuits 53, 54, 55, 56, and 58, and output terminals 63*a*, 63*b*, 64*a*, 64*b*, 65*a*, 65*b*, 66*a*, 66*b*, 67*b*, 68*a*, and 68*b*.

The data inverting circuits 11 and 12 have the same configuration as the data inverting circuit 10 shown in FIG. 1. Thus, the data inverting circuit 11 accepts as input an FLHW_FRHW signal and outputs an FRHW_FLHW signal obtained by switching FLHW data and FRHW data, to the data rearranging circuit 21. The data inverting circuit 12 accepts as input an SBL_SBR signal and outputs an SBR_SBL signal obtained by switching SBL data and SBR data, to the data rearranging circuit 22.

The data rearranging circuits 21 and 22 have the same configuration as the data rearranging circuit 20 shown in FIG. 1 and thus the logical configuration thereof is the same as that shown in FIG. 2. Hence, the data rearranging circuit 21 rearranges an FL_FR signal and the FRHW_FLHW signal inputted thereto and outputs an FL_FLHW signal and an FRHW_FR signal. The data rearranging circuit 22 rearranges an SL_SR signal and the SBR_SBL signal inputted thereto and outputs an SL_SBL signal and an SBR_SR signal.

The DA converter circuits 33, 34, 35, 36, and 38 have the same configuration as the DA converter circuits 31 and 32 shown in FIG. 1. Hence, the DA converter circuit 33 converts the FL_FLHW signal into an fl signal and an flhw signal (analog audio signals converted from FLHW data) and outputs the fl signal and the flhw signal. The DA converter circuit 34 converts the FRHW_FR signal into an fr signal and an frhw signal (analog audio signals converted from FRHW data) and outputs the fr signal and the frhw signal. The DA converter circuit 35 converts the SL_SBL signal into an sl signal and an sbl signal (analog audio signals converted from SBL data) and outputs the sl signal and the sbl signal. The DA converter circuit 36 converts the SBR_SR signal into an sr signal and an sbr signal (analog audio signals converted from SBR data) and outputs the sr signal and the sbr signal. The DA converter circuit 38 converts an SWL_SWR signal into an swl signal (analog audio signal converted from SWL data) and an swr signal (analog audio signal converted from SWR data) and outputs the swl signal and the swr signal.

Meanwhile, a C signal is such that the L channel is C data and the R channel is low-level data, and thus, R-channel data does not need to be extracted; accordingly, the DA converter circuit 37 includes only one low-pass filter. A one-bit DAC 37*a* may include only one DA converter. The DA converter circuit 37 outputs a c signal obtained by converting C data of the C signal into an analog audio signal.

The differential circuits 43, 44, 45, 46, and 48 have the same configuration as the differential circuits 41 and 42 shown in FIG. 1. Hence, the differential circuit 43 combines the flhw signal with the fl signal and outputs the resulting combined signal. The differential circuit 44 combines the frhw signal with the fr signal and outputs the resulting combined signal. The differential circuit 45 combines the sbl signal with the sl signal and outputs the resulting combined signal. The differential circuit 46 combines the sbr signal with the sr signal and outputs the resulting combined signal. The differential circuit 48 combines the swr signal with the swl signal and outputs the resulting combined signal.

The output terminals 63*a*, 63*b*, 64*a*, 64*b*, 65*a*, 65*b*, 66*a*, 66*b*, 67*b*, 68*a*, and 68*b* are terminals that output signals, and have corresponding speakers connected thereto. The FL speaker, the FR speaker, the SL speaker, the SR speaker, the C speaker, and the SW speaker (SWL speaker) are respectively connected to the output terminals 63*b*, 64*b*, 65*b*, 66*b*, 67*b*, and 68*b* (see FIG. 5B). The FLHW speaker, the FRHW speaker, the SBL speaker, the SBR speaker, and the SWR speaker are respectively connected to the output terminals 63*a*, 64*a*, 65*a*, 66*a*, and 68*a* (see FIG. 5B).

The switching circuits 53, 54, 55, 56, and 58 switch between a first output state for a 9.2ch surround output and a second output state for a 5.1ch surround output, and are switched in a coordinated manner.

When 9.2ch support speakers (i.e., the speaker system shown in FIG. 5B) are connected, the switching circuits 53, 54, 55, 56, and 58 are in the first output state (a state in which the switching circuits 53, 54, 55, 56, and 58 are connected to their respective lower terminals in FIG. 4). In this case, the fl signal outputted from the DA converter circuit 33 is outputted from the output terminal 63*b*, the fr signal outputted from the DA converter circuit 34 is outputted from the output terminal 64*b*, the sl signal outputted from the DA converter circuit 35 is outputted from the output terminal 65*b*, the sr signal outputted from the DA converter circuit 36 is outputted from the output terminal 66*b*, and the swl signal outputted from the DA converter circuit 38 is outputted from the output terminal 68*b*. The c signal outputted from the DA converter circuit 37 is outputted from the output terminal 67*b* regardless of the switching of the output state. Also, the flhw signal outputted from the DA converter circuit 33 is outputted from the output terminal 63*a*, the frhw signal outputted from the DA converter circuit 34 is outputted from the output terminal 64*a*, the sbl signal outputted from the DA converter circuit 35 is outputted from the output terminal 65*a*, the sbr signal outputted from the DA converter circuit 36 is outputted from the output terminal 66*a*, and the swr signal outputted from the DA converter circuit 38 is outputted from the output terminal 68*a*.

When 5.1ch support speakers (i.e., the speaker system shown in FIG. 5A) are connected, i.e., when the FLHW speaker, the FRHW speaker, the SBL speaker, the SBR speaker, and the SWR speaker are not connected to the output terminals 63*a*, 64*a*, 65*a*, 66*a*, and 68*a*, the switching circuits 53, 54, 55, 56, and 58 are in the second output state (a state in which the switching circuits 53, 54, 55, 56, and 58 are connected to their respective upper terminals in FIG. 4). In this case, a combined signal of the fl signal and the flhw signal which is outputted from the differential circuit 43 is outputted from the output terminal 63*b*, a combined signal of the fr signal and the frhw signal which is outputted from the differential circuit 44 is outputted from the output terminal 64*b*, a combined signal of the sl signal and the sbl signal which is outputted from the differential circuit 45 is outputted from the output terminal 65*b*, a combined signal of the sr signal and the sbr signal which is outputted from the differential circuit 46 is outputted from the output terminal 66*b*, and a combined signal of the swr signal and the swl signal which is outputted from the differential circuit 48 is outputted from the output terminal 68*b*. In addition, the c signal outputted from the DA converter circuit 37 is outputted from the output terminal 67*b*. Note that although the flhw signal, the frhw signal, the sbl signal, the sbr signal, and the swr signal are respectively outputted from the output terminals 63*a*, 64*a*, 65*a*, 66*a*, and 68*a*, speakers are not connected to these output terminals. In the second output state, the connection between the output terminals 63*a*, 64*a*, 65*a*, 66*a*, and 68*a* and the DA converter circuits 33, 34, 35, 36, and 38 may be disconnected.

With this configuration, the audio signal processing apparatus A2 can convert 9.2ch I2S signals inputted thereto into 9.2ch analog audio signals or 5.1ch analog audio signals, according to a speaker system connected thereto, and output the 9.2ch analog audio signals or the 5.1ch analog audio signals.

In the present embodiment, since an FL_FR signal and an FLHW_FRHW signal are converted into an FL_FLHW signal and an FRHW_FR signal, a signal line for a signal outputted from the DA converter circuit 33 does not intersect with a signal line for a signal outputted from the DA converter circuit 34. In addition, since an SL_SR signal and an SBL_SBR signal are converted into an SL_SBL signal and an SBR_SR signal, a signal line for a signal outputted from the DA converter circuit 35 does not intersect with a signal line for a signal outputted from the DA converter circuit 36. Accordingly, a circuit block of a portion including the DA converter circuit 33 and the differential circuit 43, a circuit block of a portion including the DA converter circuit 34 and the differential circuit 44, a circuit block of a portion including the DA converter circuit 35 and the differential circuit 45, and a circuit block of a portion including the DA converter circuit 36 and the differential circuit 46 are each independently pattern-wired. Thus, detouring one of pattern wirings by a jumper wire or detouring one of pattern wirings by a through-hole and a pattern wiring formed on the back side does not need to be performed. Accordingly, superimposition of noise on an analog audio signal flowing through a part of a plurality of pattern wirings for analog audio signals can be suppressed, which is caused by the part of pattern wirings for analog audio signals becoming longer than other pattern wirings for analog audio signals; accordingly, degradation of sound quality can be prevented.

Note that, when 5.1ch I2S signals are inputted to the audio signal processing apparatus A2, 5.1ch analog audio signals are outputted regardless of the output state. That is, since an FLHW_FRHW signal is not inputted, the R channel of an FL_FLHW signal outputted from the data rearranging circuit 21 is low-level data and the L channel of an FRHW_FR signal is low-level data, and thus, an flhw signal is not outputted from the DA converter circuit 33 and an frhw signal is not outputted from the DA converter circuit 34. Accordingly, signals are not outputted from the output terminals 63_a_ and 64_a_ and an fl signal and an fr signal are respectively outputted from the output terminals 63_b_ and 64_b_ regardless of the output state. Similarly, since an SBL_SBR signal is not inputted, signals are not outputted from the output terminals 65_a_ and 66_a_ and an sl signal and an sr signal are respectively outputted from the output terminals 65_b_ and 66_b_ regardless of the output state. Moreover, since, instead of an SWL_SWR signal, an SW signal in which the L channel is SW data (audio data converted into audio to be outputted from the SW speaker) and the R channel is low-level data is inputted, a signal is not outputted from the output terminal 68_a_ and an sw signal (an analog audio signal converted from SW data) is outputted from the output terminal 68_b_ regardless of the output state.

Although the first and second embodiments describe the case in which digital audio signals transmitted in the I2S format are inputted, the present invention is not limited thereto. The present invention can be applied to the case of a digital audio signal in which two types of audio data are alternately arranged on a word-data basis. For example, the present invention can also be applied to various formats such as a right-justified format, a left-justified format, a left-justified DSP format, and a 32×Fs Packed format.

Note that in the first and second embodiments L-channel audio data and R-channel audio data of one of DATA signals are switched by a data inverting circuit so that data units of the same channel in the two DATA signals can be combined. Therefore, when L-channel data of one of DATA signals is combined with R-channel data of the other DATA signal, a data inverting circuit is not required.

Audio signal processing apparatuses according to the present invention are not limited to those described in the above embodiments. Various design changes can be made to a specific configuration of each unit of the audio signal processing apparatuses according to the present invention.

What is claimed is:

1. An audio signal processing apparatus comprising:

an audio data generation part for generating third audio data from first audio data and second audio data, the first audio data including first L-channel data and first R-channel data which are alternately and serially arranged in a word unit, the second audio data including second L-channel data and second R-channel data which are alternately and serially arranged in the word unit, and the third audio data including the first L-channel data and the second L-channel data which are alternately and serially arranged in the word unit;

a DA conversion part for dividing the third audio data into the first L-channel data and the second L-channel data and converting the first L-channel data and the second L-channel data into a first analog signal and a second analog signal, respectively; and a combining part for combining the first analog signal with the second analog signal to form a third analog signal.

2. The audio signal processing apparatus according to claim 1, further comprising a switching part for switching between a first output state in which only the first analog signal and the second analog signal are outputted, and a second output state in which at least the third analog signal is outputted.

3. The audio signal processing apparatus according to claim 2, wherein the audio data generation part further generates fourth audio data including the first R-channel data and the second R-channel data which are alternately and serially arranged in the word unit, the audio signal processing apparatus further comprises:

a second DA conversion part for dividing the generated fourth audio data into the first R-channel data and the second R-channel data and converting the first R-channel data and the second R-channel data into a fourth analog signal and a fifth analog signal, respectively; and a second combining part for combining the fourth analog signal with the fifth analog signal to form a sixth analog signal, and when an output state is switched to the first output state by the switching part, only the first analog signal, the second analog signal, the fourth analog signal, and the fifth analog signal are outputted, and when an output state is switched to the second output state, at least the third analog signal and the sixth analog signal are outputted.

4. The audio signal processing apparatus according to claim 3, wherein the audio data generation part, the DA conversion part, the second DA conversion part, the combining part, and the second combining part each are provided in at least two pieces, six 9.2ch audio data units are inputted, and when an output state is switched to the first output state by the switching part, the first analog signal, the second analog signal, the fourth analog signal, and the fifth analog signal are outputted as 9.2ch analog signals, and when an output state is switched to the second output state by the switching part, the third analog signal and the sixth analog signal are outputted as 5.1ch analog signals.

5. The audio signal processing apparatus according to claim 1, wherein the audio data generation part accepts as input a word clock which is inverted in the word unit; the first audio data with which a low level of the word clock and the first L-channel data are synchronized; and the second audio data with which a high level of the word clock and the second L-channel data are synchronized, and the audio data generation part includes:

a first AND circuit that generates first extracted audio data by extracting the first L-channel data by computing an AND of the first audio data and an inverted clock obtained by inverting the word clock;

a second AND circuit that generates second extracted audio data by extracting the second L-channel data by computing an AND of the second audio data and the word clock; and an OR circuit that generates the third audio data by computing an OR of the first extracted audio data and the second extracted audio data.

6. The audio signal processing apparatus according to claim 1, wherein the first audio data is I2S-format digital audio data and the second audio data is data obtained by switching L-channel data and R-channel data of I2S-format digital audio data.

7. The audio signal processing apparatus according to claim 1, wherein the audio data generation part further generates fourth audio data including the first R-channel data and the second R-channel data which are alternately and serially arranged in the word unit, the audio signal processing apparatus further comprises:

a second DA conversion part for dividing the generated fourth audio data into the first R-channel data and the second R-channel data and converting the first R-channel data and the second R-channel data into a fourth analog signal and a fifth analog signal, respectively; and a second combining part for combining the fourth analog signal with the fifth analog signal to form a sixth analog signal.

8. An audio signal processing apparatus comprising:

an audio data generation part for generating third audio data from first audio data and second audio data, the first audio data including first L-channel data and first R-channel data which are alternately and serially arranged in a word unit, the second audio data including second L-channel data and second R-channel data which are alternately and serially arranged in the word unit, and the third audio data including the first R-channel data and the second R-channel data which are alternately and serially arranged in the word unit;

a DA conversion part for dividing the third audio data into the first R-channel data and the second R-channel data and converting the first R-channel data and the second R-channel data into a first analog signal and a second analog signal, respectively; and a combining part for combining the first analog signal with the second analog signal to form a third analog signal.

9. The audio signal processing apparatus according to claim 8, further comprising a switching part for switching between a first output state in which only the first analog signal and the second analog signal are outputted, and a second output state in which at least the third analog signal is outputted.

10. The audio signal processing apparatus according to claim 8, wherein the audio data generation part accepts as input a word clock which is inverted in the word unit; the first audio data with which a high level of the word clock and the first R-channel data are synchronized; and the second audio data with which a low level of the word clock and the second R-channel data are synchronized, and the audio data generation part includes:

a first AND circuit that generates first extracted audio data by extracting the first R-channel data by computing an AND of the first audio data and the word clock;

a second AND circuit that generates second extracted audio data by extracting the second R-channel data by computing an AND of the second audio data and an inverted clock obtained by inverting the word clock; and an OR circuit that generates the third audio data by computing an OR of the first extracted audio data and the second extracted audio data.

11. The audio signal processing apparatus according to claim 8, wherein the first audio data is I2S-format digital audio data and the second audio data is data obtained by switching L-channel data and R-channel data of I2S-format digital audio data.

* * * * *